(12) United States Patent
Brandwine et al.

(10) Patent No.: US 10,382,195 B2
(45) Date of Patent: *Aug. 13, 2019

(54) VALIDATING USING AN OFFLOAD DEVICE SECURITY COMPONENT

(71) Applicant: Amazon Technologies, Inc., Seattle, WA (US)

(72) Inventors: Eric Jason Brandwine, Haymarket, VA (US); David R. Richardson, Seattle, WA (US); Matthew Shawn Wilson, Seattle, WA (US); Ian Paul Nowland, Seattle, WA (US); Anthony Nicholas Liguori, Bainbridge Island, WA (US); Brian William Barrett, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/603,317

(22) Filed: May 23, 2017

(65) Prior Publication Data

US 2018/0013552 A1 Jan. 11, 2018

Related U.S. Application Data

(63) Continuation of application No. 14/673,729, filed on Mar. 30, 2015, now Pat. No. 9,667,414.

(51) Int. Cl.
*H04L 9/32* (2006.01)
*H04L 9/08* (2006.01)

(52) U.S. Cl.
CPC .......... *H04L 9/0819* (2013.01); *H04L 9/0861* (2013.01); *H04L 9/32* (2013.01); *H04L 9/3247* (2013.01)

(58) Field of Classification Search
CPC ................................ H04L 9/32; H04L 9/3247
(Continued)

(56) References Cited

U.S. PATENT DOCUMENTS 4,674,038 A 6/1987 Brelsford et al.
6,985,937 B1 1/2006 Keshav et al.
(Continued)

OTHER PUBLICATIONS

Applied Cryptography by Bruce Schneier—Second Edition: Protocol, Algorithms and source (Chapter 22 Diffie Hellman algorithm (section 22.1) ) (Chapter 2 ( section 2.5)), Publisher John Wiley &Sons, INc. (Pub. date :Jan. 1, 1996).*

(Continued)

*Primary Examiner* — Jason K Gee
*Assistant Examiner* — Dereena T Cattungal
(74) *Attorney, Agent, or Firm* — Knobbe, Martens, Olson & Bear, LLP

(57) ABSTRACT

Generally described, physical computing devices in a virtual network can be configured to host a number of virtual machine instances. The physical computing devices can be operably coupled with offload devices. In accordance with an aspect of the present disclosure, a security component can be incorporated into an offload device. The security component can be a physical device including a microprocessor and storage. The security component can include a set of instructions configured to validate an operational configuration of the offload device or the physical computing device to establish that they are configured in accordance with a secure or trusted configuration. In one example, a first security component on the offload device can validate the operational computing environment on the offload device and a second security component on the physical computing device can validate the operational computing environment on the physical computing device.

17 Claims, 11 Drawing Sheets

(58) Field of Classification Search
USPC .......................................................... 713/171
See application file for complete search history.

(56) References Cited

U.S. PATENT DOCUMENTS

| | | | |
|---|---|---|---|
| 7,716,730 B1 | 5/2010 | Droux et al. | |
| 8,220,035 B1* | 7/2012 | Pravetz | H04L 63/1483 |
| | | | 715/749 |
| 8,391,494 B1* | 3/2013 | Serenyi | H04L 63/0428 |
| | | | 380/278 |
| 8,448,238 B1 | 5/2013 | Gupta et al. | |
| 8,489,898 B2 | 7/2013 | Wong | |
| 8,510,859 B2 | 8/2013 | Zimmer et al. | |
| 8,763,091 B1 | 6/2014 | Singh et al. | |
| 8,904,190 B2 | 12/2014 | Wong | |
| 8,990,560 B2 | 3/2015 | Massey et al. | |
| 9,147,086 B1 | 9/2015 | Potlapally et al. | |
| 9,176,752 B1 | 11/2015 | Marr et al. | |
| 9,292,332 B1 | 3/2016 | Liguori et al. | |
| 9,400,674 B2 | 7/2016 | Liguori et al. | |
| 9,424,067 B2 | 8/2016 | Liguori et al. | |
| 9,535,798 B1 | 1/2017 | Liguori | |
| 9,626,512 B1 | 4/2017 | Brandwine et al. | |
| 9,667,414 B1 | 5/2017 | Brandwine et al. | |
| 9,760,394 B2 | 9/2017 | Liguori et al. | |
| 9,886,297 B2 | 2/2018 | Liguori et al. | |
| 10,211,985 B1 | 2/2019 | Brandwine et al. | |
| 10,216,539 B2 | 2/2019 | Liguori et al. | |
| 2004/0225873 A1 | 11/2004 | Diaz | |
| 2005/0108712 A1 | 5/2005 | Goyal | |
| 2006/0149962 A1 | 7/2006 | Fountain et al. | |
| 2006/0256108 A1 | 11/2006 | Scaralata | |
| 2007/0005955 A1 | 1/2007 | Pyle et al. | |
| 2007/0074031 A1 | 3/2007 | Adams et al. | |
| 2007/0094719 A1 | 4/2007 | Scarlata | |
| 2007/0255920 A1 | 11/2007 | Gold | |
| 2008/0175382 A1 | 7/2008 | Gearhart et al. | |
| 2008/0216150 A1 | 9/2008 | Brabson et al. | |
| 2008/0244569 A1 | 10/2008 | Challener et al. | |
| 2008/0271134 A1 | 10/2008 | Johnson et al. | |
| 2008/0307218 A1 | 12/2008 | Logvinov | |
| 2009/0049510 A1* | 2/2009 | Zhang | G06F 21/53 |
| | | | 726/1 |
| 2009/0172328 A1 | 7/2009 | Sahita et al. | |
| 2009/0217374 A1 | 8/2009 | Liu et al. | |
| 2009/0319782 A1 | 12/2009 | Lee | |
| 2010/0049968 A1 | 2/2010 | Dimitrakos et al. | |
| 2010/0058060 A1 | 3/2010 | Schneider | |
| 2010/0082991 A1* | 4/2010 | Baldwin | H04L 9/083 |
| | | | 713/176 |
| 2010/0122124 A1 | 5/2010 | Chen et al. | |
| 2010/0138674 A1 | 6/2010 | Dimitrakos et al. | |
| 2010/0218183 A1 | 8/2010 | Wang et al. | |
| 2010/0228819 A1 | 9/2010 | Wei | |
| 2010/0325628 A1* | 12/2010 | Haga | G06F 21/575 |
| | | | 718/1 |
| 2010/0333090 A1 | 12/2010 | Wright et al. | |
| 2011/0010543 A1 | 1/2011 | Schmidt et al. | |
| 2011/0066786 A1 | 3/2011 | Colbert | |
| 2011/0202765 A1 | 8/2011 | McGrane et al. | |
| 2011/0202916 A1 | 8/2011 | Voba et al. | |
| 2012/0005401 A1 | 1/2012 | Anand et al. | |
| 2012/0102334 A1 | 4/2012 | O'Loughlin et al. | |
| 2012/0150816 A1 | 6/2012 | Pafumi et al. | |
| 2012/0266169 A1 | 10/2012 | Lagergren et al. | |
| 2013/0152079 A1 | 6/2013 | Heyman et al. | |
| 2013/0159686 A1 | 6/2013 | Graham et al. | |
| 2013/0227281 A1* | 8/2013 | Kounga | G06F 21/44 |
| | | | 713/165 |
| 2013/0238786 A1 | 9/2013 | Khesin | |
| 2013/0297934 A1 | 11/2013 | Suni et al. | |
| 2013/0304899 A1 | 11/2013 | Winkler | |
| 2014/0026124 A1 | 1/2014 | Gilbert et al. | |
| 2014/0040886 A1* | 2/2014 | Coles | G06F 9/4401 |
| | | | 718/1 |
| 2014/0082614 A1 | 3/2014 | Klein et al. | |
| 2014/0089658 A1 | 3/2014 | Raghuram et al. | |
| 2014/0122825 A1 | 5/2014 | Kono et al. | |
| 2014/0137180 A1 | 5/2014 | Lukacs et al. | |
| 2014/0143842 A1 | 5/2014 | Lo et al. | |
| 2014/0157397 A1 | 6/2014 | Dalal et al. | |
| 2014/0173709 A1 | 6/2014 | Eldar et al. | |
| 2015/0135311 A1 | 5/2015 | MacKintosh et al. | |
| 2015/0212844 A1* | 7/2015 | Tsirkin | G06F 9/45558 |
| | | | 718/1 |
| 2016/0117498 A1 | 4/2016 | Saxena et al. | |
| 2016/0170781 A1 | 6/2016 | Liguori et al. | |
| 2016/0170784 A1 | 6/2016 | Liguori et al. | |
| 2016/0170785 A1 | 6/2016 | Liguori et al. | |
| 2016/0269421 A1 | 9/2016 | Hayes | |
| 2016/0313986 A1 | 10/2016 | Liguori et al. | |
| 2017/0011395 A1 | 1/2017 | Pillai et al. | |
| 2017/0052808 A1 | 2/2017 | Liguori et al. | |
| 2017/0090971 A1 | 3/2017 | Liguori et al. | |
| 2017/0206146 A1 | 7/2017 | Liguori | |
| 2018/0136961 A1 | 5/2018 | Liguori et al. | |
| 2018/0300166 A1 | 10/2018 | Liguori et al. | |

OTHER PUBLICATIONS

Liu, J., et al., High Performance VMM-Bypass I/O in Virtual Machines, USENIX Annual Technical Conference, General Track, 2006, pp. 29-42.

Raj, H., and K. Schwan, High Performance and Scalable I/O Virtualization via Self-Virtualized Devices, Proceedings of the 16th International Symposium on High Performance Distributed Computing, ACM, 2007, pp. 179-188.

Schneier, B., Applied Cryptography, 2nd Ed., Protocol, Algorithms and Source, Chapter 22, Diffie Hellman Algorithm, Section 22.1, Chapter 2, Section 2.5), John Riley &Sons, Inc., Jan. 1, 1996.

Uhlig, V., et al. Towards Scalable Multiprocessor Virtual Machines, Virtual Machine Research and Technology Symposium, 2004, pp. 43-56.

Garfinkel, Tai, et al. "Terra: A virtual machine-based platform for trusted computing." ACM SIGOPS Operating Systems Review. vol. 37. No. 5. ACM, 2003.pp. 193-206.

Krsul, Ivan, et al. "Vmplants: Providing and managing virtual machine execution environments for grid computing." Proceedings of the 2004 ACM/IEEE conference on Supercomputing. IEEE Computer Society, 2004. pp. 1-12.

Nurmi, Daniel, et al. "The eucalyptus open-source cloud-computing system." Cluster Computing and the Grid, 2009. CCGRID'09. 9th IEEE/ACM International Symposium on. IEEE, 2009.pp. 124-131.

\* cited by examiner

CRYPTOGRAPHIC KEY RELEASE ROUTINE

VALIDATING USING AN OFFLOAD DEVICE SECURITY COMPONENT

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources within the data centers, virtualization technologies may allow a single physical computing device to host one or more instances of virtual machines that appear and operate as independent computing devices to users of a data center. With virtualization, software applications running on the physical computing device can create, maintain, delete, or otherwise manage virtual machine instances in a dynamic manner.

Use of data centers in increasing numbers has created increased demand for the computing resources. Some users require the use of data centers for high value or high security workloads. Some users require computing resources that comply with stringent regulatory and contractual obligations, such obligations can require computing resources that run on data centers with a secure infrastructure of hardware.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings.

DETAILED DESCRIPTION

Figure 1:
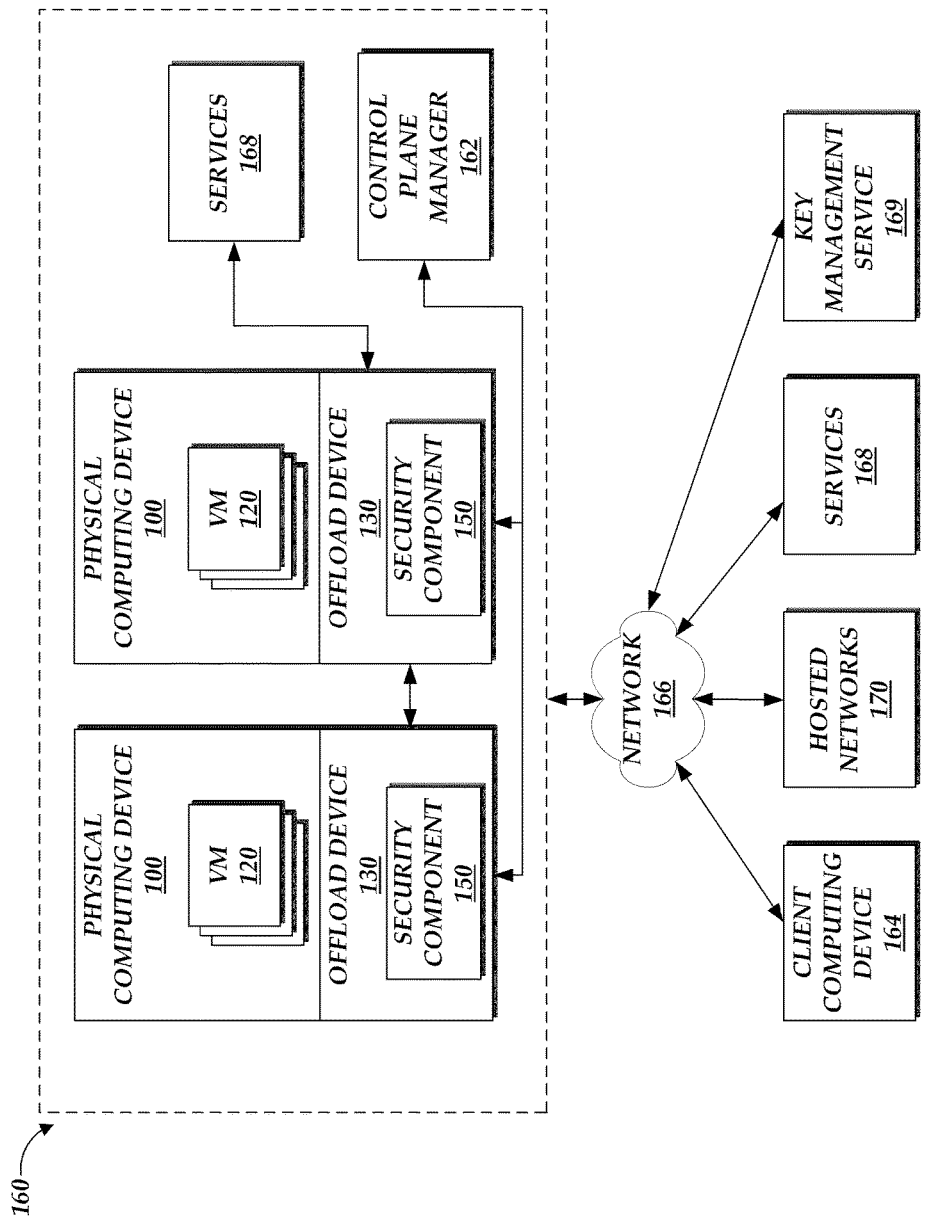
FIG. 1 is a block diagram depicting an illustrative environment for managing physical computing devices including a number of client computing device, and network-based services.

Generally described, physical computing devices in a virtual network can be configured to host a number of virtual machine instances. The physical computing devices can be operably coupled with offload devices. In accordance with an illustrative embodiment, the offload devices include physical computing resources (e.g., processor and memory) separate from the physical computing resources of the physical computing device. Executable code, such as an offload device operating system, can be run on the processor in the memory of the offload device. The offload device can be operably coupled to the physical computing device via an interconnect interface. Illustratively, the interconnect interface can be a high speed, high throughput, low latency interface such as a Peripheral Component Interconnect Express (PCIe) interface.

In accordance with an aspect of the present disclosure, a security component, such as a Trusted Platform Module (TPM) or cryptoprocessor, can be incorporated into the offload device. In an embodiment, the security component can include a set of instructions configured to validate an operational configuration of the offload device or the physical computing device to establish that they are configured in accordance with a secure or trusted configuration. In one example, a first security component on the offload device can validate boot environment code (e.g., a boot loader, hardware firmware, etc.) and execution environment code (e.g., code that runs during operation of the offload device and controls the offload device) on the offload device. The offload device can then be used as a trusted component within a service provider environment.

In an embodiment, validating the offload device can include using a platform component configuration to unseal a key stored in the security component. For example, the security component can take measurements of firmware, software, and/or configuration data on the offload device or physical computing device and confirm that the measurements are the same as reference measurements stored in the security component and use some or all of the measurements to unseal a cryptographic key. The firmware, software, and configuration data that are measured can be generally referred to as platform components, with each measurement being associated with a separate platform component. The act of validating a computing device, such as the offload device and the physical computing device, as a trusted computing platform can also referred to as establishing a root-of-trust. In an example embodiment, the boot environment code and the execution environment code can be validated, and the offload device itself can be used as a root-of-trust. A trusted computing platform signifies that the computing device is operating using a determined trusted configuration of platform components. The platform components can relate to the boot (or booting) environment or the execution environment. The booting environment can be a grouping of platform components, such as the code that runs during booting of the offload device and the physical computing device. This can help defend against software-based attacks aimed at stealing sensitive information by corrupting system code, Basic Input/Output System (BIOS) code, or modifying the platform configuration. The execution environment can be a grouping of platform components, such as the code that executes after boot, such as code that controls the operation of the offload device.

Illustratively, during a boot process, the security component can be utilized to validate the booting environment and/or the execution environment of the offload device or the physical computing device. The offload device may be booted as part of the boot process of the physical computing device. The utilization of the security component on the offload device can be synchronized with the boot processes of the physical computing device. A security component on the offload device provides an additional layer of security for platform components on the offload device and a service provider operating the physical computing device, in addition to the level of security provided by a security component on the physical computing device. Validation of the booting environment on the offload device by the security component provides validation of a secure booting environment on the offload device that can be independent of validation of the physical computing device, which may be subject to malware, corruption, or other adverse operating conditions. Similarly, validation of the execution environment on the offload device ensures that only trusted code runs on the offload device. Depending on the outcome of the validation, a control system operated by the service provider and/or an execution environment code that runs on the offload device can be configured to determine how to proceed during the boot process.

In accordance with an illustrative embodiment, the security component on the offload device can unseal cryptographic keys for use after validation of the booting environment and/or the execution environment of the offload device. In accordance with some embodiments, only the booting environment of the offload device needs to be validated for the security component to unseal keys for use. In another embodiment, the booting environment and the execution environment need to be validated for the security component to unseal one or more cryptographic keys. The cryptographic keys can provide access to encrypted information associated with the operation of the offload device and/or the physical computing device, keys used to communicate with other systems and services, etc.

In some embodiments, a validation may include validating platform components on the physical computing device and the offload device. For example, the boot environment and/or execution environment of the offload device along with the boot environment of the physical computing device can be validated. Thereby, the security component on the offload device and the security component on the physical computing device can communicate with each other to determine validation of a composite environment that encompasses platform components on both the offload device and the physical computing device. Security of the system can be increased by including a second security component on the physical computing device in addition to the first security component on the offload device.

In an illustrative embodiment, the offload device can instantiate virtual security modules, which can be made available to virtual machine instances. In this example embodiment, the virtual security modules can be backed by the security component on the offload device. For example, the virtual machine instances can interact with the security component via a virtual security module. The virtual security module may be implemented on each virtual machine instance or may centrally manage interactions between the virtual machine instances and the security component. For example, a single virtual security module can be used by multiple virtual machine instances or the offload device can instantiate a virtual security module for each virtual machine instance. In either case, a virtual security module can be used to validate the booting environment of each virtual machine instance. In some embodiments, a virtual security module may manage the requests for validation of a booting environment by receiving a request for validation of the booting environment from a virtual machine instance.

In certain embodiments, the virtual security module can communicate with the security component on the offload device to confirm validation of the booting environment and/or the execution environment of the offload device. The virtual security module may then receive an indication that the booting environment code and/or execution environment code has been validated from the security component and pass the indication to the virtual machine instance. In some example embodiments, the indication could be the measurement used to unseal a key or the indication could be a message signed by a private key that is unsealed when the booting and/or execution environment code is validated.

By managing requests for validation from each associated virtual machine instance, the virtual security module may provide validation without requiring that each virtual machine instance request validation from the physical security component. In some embodiments, changes in the underlying security component and/or hardware infrastructure may be made opaque to the virtual machine instances utilizing the underlying hardware infrastructure and/or virtual security module.

In a specific example embodiment, a security component on the offload device can store one or more cryptographic keys. The cryptographic keys can be unsealed if the execution environment code of the offload device has been validated by the security component. The cryptographic keys can include API keys that correspond to network-based services. The API keys can allow the offload device to communicate with network-based services. For example, the offload device can use a cryptographic key to sign a request to communicate with a control plane manager. As another example, the offload device can use a cryptographic key to communicate with a network-based storage service to attach a storage volume. For example, in certain embodiments, the security component and the offload device can use private keys to negotiate a symmetric key between different services. For example, the symmetric key can be used to encrypt I/O sent from a guest computing device and a network-based storage volume.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to illustrative components of host computing device, one or more aspects of the present disclosure can be applied with regard to different types or configurations of physical computing devices or combinations thereof.

FIG. 1 is a block diagram illustrating an embodiment of a service provider environment 160. The service provider environment 160 can include multiple physical computing devices 100, which can also be referred to as host computing devices. The physical computing devices 100 can include offload devices 130. The offload devices 130 can be operably coupled to the physical computing devices 100 via an interconnect interface. For example, the offload device 130 can include an interconnect bus, used to connect to computer device 100. The offload devices 130 may provide network interface services, such as a network interface card (NIC) for enabling network communication between the physical computing device and components located within and outside of the service provider environment 160. The offload device can include security components 150, described in more detail in subsequent paragraphs.

The physical computing device 100 includes one or more processing units, such as one or more CPUs and memory, which may correspond to any combination of volatile or non-volatile computer-readable storage media. The memory may store information which includes various programs, program data, and other modules. The programs stored in the memory can include a virtual machine monitor application (not illustrated in FIG. 1, but illustrated in FIG. 3) that can manage the virtual machine instances 120 (e.g., by allocating memory to each virtual machine instance and scheduling virtual processors to run on physical processors) as will be discussed in greater detail in connection with FIG. 3. The physical computing device 100 can correspond to a wide variety of devices, such as servers, that include a wide variety of software and hardware components and configurations. The physical computing device 100 can include a local data store, or be configured to communicate with a data store over a network.

Figure 3:
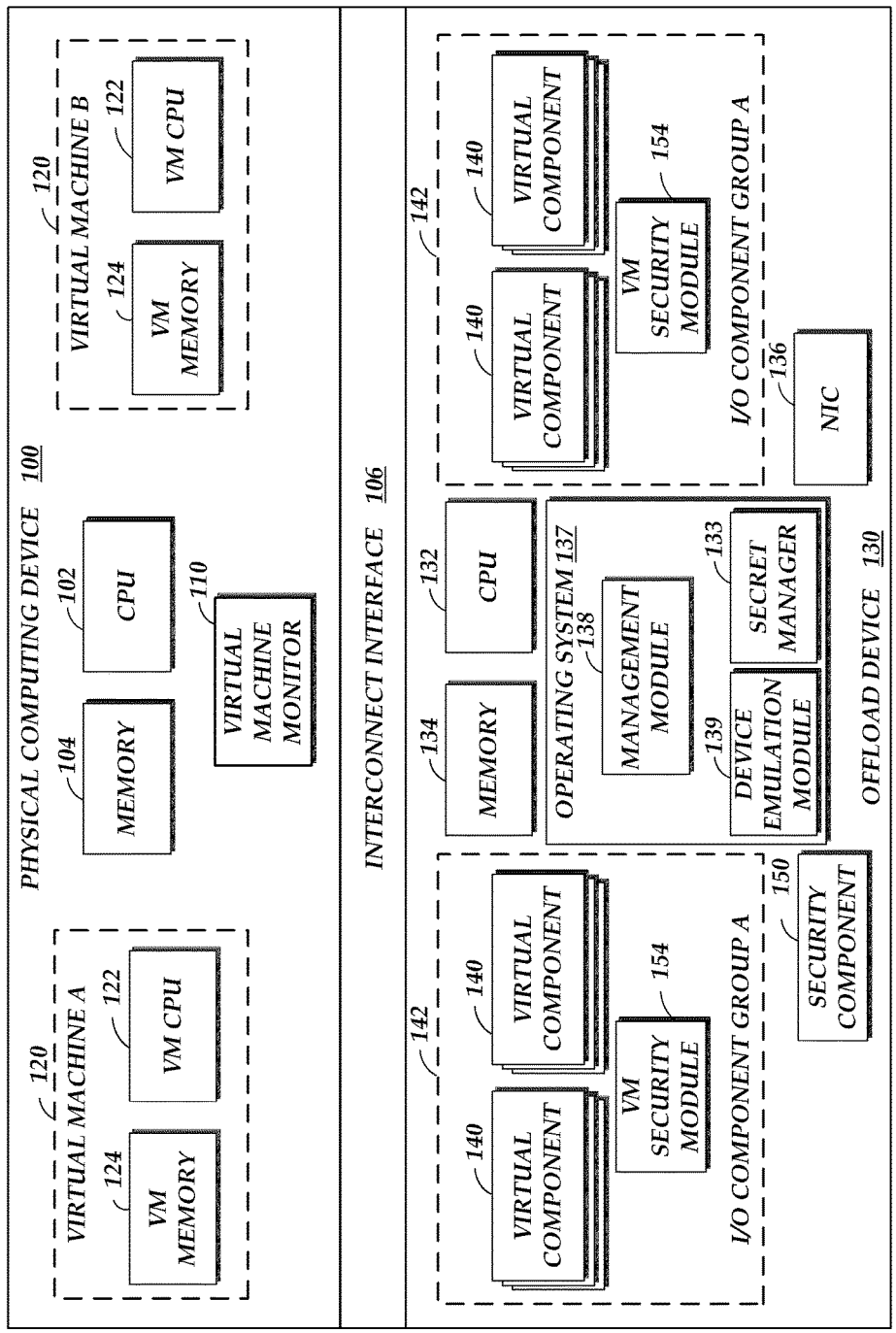
FIG. 3 is a block diagram depicting an embodiment of a physical computing device with an embodiment of an offload device.

Additionally, in some embodiments, one or more of the physical computing devices 100 are capable of hosting multiple virtual machine instances 120. For example, each physical computing device 100 can run a virtual machine manager. An exemplary embodiment of physical computing device 100 hosting virtual machine instances 120 is illustrated in FIG. 3.

The offload device 130 may be a computing device, or partial computing device, communicatively coupled to the physical computing device 100. In some embodiments, the offload device 130 can be a network interface controller, a disk drive controller, a bus controller, or other dedicated computing device. In some embodiments, the offload device 130 is physically coupled to the physical computing device 100. The offload device 130 can include one or more processing units, such as one or more CPUs. The offload device 130 can include memory, which may correspond to any combination of volatile or non-volatile computer-readable storage media. The memory may store execution environment code such as the executable instructions that control the offload device during runtime operation. For example, such execution environment code can include, but is not limited to an operating system, a manager module, drivers for the hardware on the offload device, device emulation modules (e.g., used to instantiate virtual devices such as a virtual security component), a secret manager (e.g., used to store cryptographic keys, digital certificates, etc.). In addition the memory may store data, encryption keys, and configuration information. The processor and memory of the offload device are separate from the processor and memory of the physical computing device. The offload device 130 can include a local data store, and/or be configured to communicate with a data store over a network.

The service provider environment 160 also includes one or more network-based services 168 for managing the implementation of changes to physical computing devices 100. Illustratively, the network-based services 168 can provide functionality to one or more of the physical computing devices 100, either for the benefit of a service provider, customer, third party, or a combination thereof. For example, the network-based services 168 can include storage servers, used to host volumes that can be allocated to virtual machine instances, security services related to the management of communications, encryption of content, etc. In another example, the network-based services 168 can include a provisioning service related to the establishment or configuration of operating environments, software applications, software updates, software configurations that will be executed by a customer on a physical computing device 100. In a further example, the network-based services 168 can also include financial and accounting services related to the management of financial transaction information between customers and the service provider based on utilization of the host computing devices. Additional or alternative network-based services may also be contemplated. Additionally, although the network-based services 168 are described as being integrated in the service provider environment 160, one or more network-based services may be implemented external to the service provider environment 160 as also illustrated in FIG. 1.

With continued reference to FIG. 1, connected to the service provider environment 160 via a network 166 are multiple client computing devices 164. The network 166 may be, for instance, a wide area network (WAN), a local area network (LAN), or a global communications network. In some instances, the client computing devices 164 may interact with the service provider environment 160 to request the allocation of one or more physical computing devices 100 on behalf of a customer. Additionally, the service provider environment 160 may be integrated with other hosted client computing networks 170. As previously described, in some embodiments, one or more of the network-based services 168 may be separate from the service provider environment 160.

Those skilled in the art will recognize that the client computing device 164 may be any of a number of computing devices that are capable of communicating over a network including, but not limited to, a laptop, personal computer, personal digital assistant (PDA), hybrid PDA/mobile phone, mobile phone, wearable computing device, electronic book reader, digital media player, tablet computer, gaming console or controller, and the like.

With continued reference to FIG. 1, the virtual computing environment 160 can include a key management service 169. The key management service 169 can be a hardware security component (HSM) type-service, which can be used to safeguard and manage cryptographic keys. The key management service 169 can be employed in applications that require the use of digital keys for safeguarding important and high value information. The key management service 169 can be configured to perform functions such as secure cryptographic key generation, onboard secure cryptographic key storage and management, use of cryptographic and sensitive data material, asymmetric and symmetric cryptography, as well as other security related functions. The key management service 169 can include a plurality of clustered hardware devices for management of the cryptographic functions to increase the redundancy and availability of the service.

The service provider environment 160 can be configured such that the client computing devices 164 can control the operation of the virtual machines hosted on physical computing devices 100. The service provider environment 160 can be configured such that administrators, personnel, or other management devices associated with the overall operation of the service provider environment 160 do not have access to client data and applications operating on the physical computing devices 100. Administrators can perform administrative functions associated with the management of the physical computing devices 100 without accessing the client data and information. In this manner, the client can manage and control type of information that is sent and received from the service provider environment 160.

The security component 150 on the offload device can be used to manage cryptographic keys. The security component can include a cryptographic key, which can be referred to as a root key, that is embedded within the security component 150 by a third party. In some embodiments, the root key can be physically embedded within the security component 150 during manufacturing of the security component 150. In some embodiments, the key may not be physically embedded into the security component, but may be installed in protected shielded memory on the device that prevents the removal or access to the private root key. The root key can have a corresponding public key that is made publicly available. The service provider does not have access to the private root key, only the public key. The key management service 169 can communicate with the security component 150 on the offload device to transfer private keys to the security component for use by the offload device by utilizing the root key. In some, the security component 150 can be configured to perform functions such as onboard secure cryptographic key generation, onboard secure cryptographic key storage and management, use of cryptographic and sensitive data material, asymmetric and symmetric cryptography, as well as other cryptographic and security related functions.

The service provider environment 160 is depicted in FIG. 1 as operating in a distributed computing environment comprising several computer systems that are interconnected using one or more computer networks. The service provider environment 160 could also operate within a computing environment having a fewer or greater number of elements than are illustrated in FIG. 1. Thus, the depiction of service provider environment 160 in FIG. 1 should be taken as illustrative and not limiting to the present disclosure.

Figure 2A:
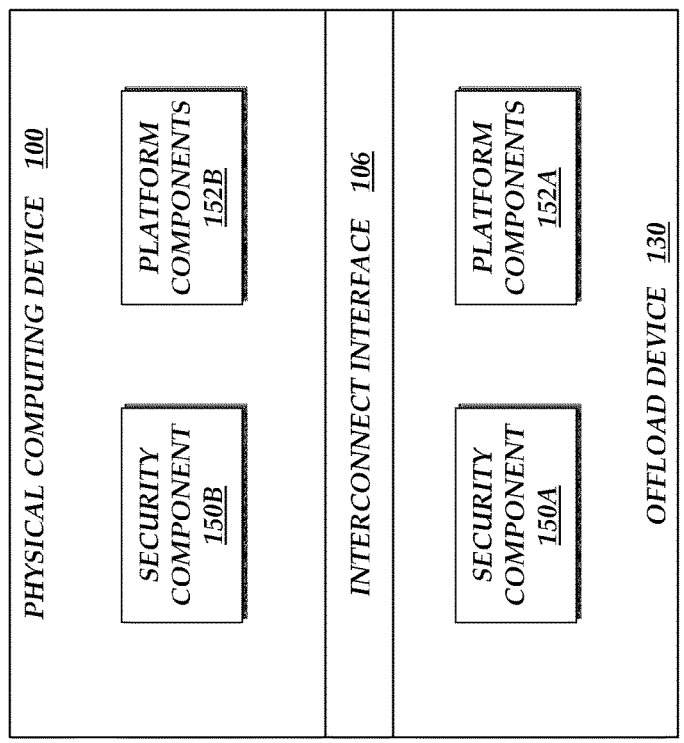
FIG. 2A is a block diagram depicting an embodiment of illustrative components and configurations of a physical computing device and offload device.

FIG. 2A is a block diagram depicting an embodiment of a physical computing device 100 with an offload device 130 and security components 150A and 150B on the offload device 130 and the physical computing device 100, respectively. The offload device 130 and physical computing device 100 include a number of firmware and software components, generally referred to as platform components 152. More specifically, the platform components can include one or more boot loaders, device drivers, firmware, software, configuration data, data structures, computer-readable code, or any type of information that can be loaded into memory and measured by the security component 150. Platform components 152A are on the offload device 130 and platform components 152B are on the physical computing device 100. Some platform components 152 may include booting environment code and others may include software that runs during operation of the server (e.g., the virtual machine monitor and any software that communicates with services operated by the service provider).

The offload device 130 can be communicatively coupled to the physical computing device 100 via the interconnect interface 106. The interconnect interface 106 can refer to a physical communication interface on the physical computing device 100. The interconnect interface 106 can be an electrical communication interface, an optical communication interface or other type of interconnect interface known in the art. The interconnect interface 106 can be configured to provide communications between components hosted on the offload device 130 with the virtual machine manager 110 (as illustrated in FIG. 3) and virtual machine instances 120 hosted on the physical computing device 100. Illustratively, the configuration of the interconnect interface can be optimized based on specific criteria, such as low latency, high speed, and high bandwidth, among others. In some embodiments, the interconnect interface can correspond to a high speed serial computer expansion bus, such as a Peripheral Component Interconnect Express (PCIe) bus. However, one skilled in the relevant art will appreciate that the interconnect interface may incorporate alternative or additional standard interconnect interfaces well known to those skilled in the art of computer architectures.

FIG. 3 illustrates an illustrative embodiment of a physical computing device and an offload device 130. The physical computing device 100 includes one or more processing units 102, such as one or more CPUs. The physical computing device 100 includes memory 104, which may correspond to any combination of volatile or non-volatile computer-readable storage media. The physical computing device 100 is capable of hosting a plurality of virtual machine instances 120. The virtual machine monitor 110 can manage virtual machine instances 120 hosted on the physical computing device 100. Illustratively, the management of the virtual machine instances 120 can include the instantiation of the virtual machine instance and the instantiation of virtual components utilized in the execution of the virtual machine instance. Additionally, the management of the virtual instances can further include the management of interaction between the virtual machine instances and the offload device 130. In the illustrated embodiment, the physical computing device 100 includes two instantiated, or hosted, virtual machine instances 120, virtual machine instance "A" and virtual machine instance "B". One skilled in the relevant art will appreciate, however, that the physical computing device 100 can host any number of virtual machine instances and is not limited to the hosting of the two virtual machine instances illustrated in FIG. 3.

As introduced above, the offload device 130 is a computing device, or partial computing device, operably coupled to the physical computing device 100. The offload device 130 includes memory 134, which may correspond to any combination of volatile or non-volatile computer-readable storage media. The memory 134 may store information and various programs, program data, and modules, such as executable code that forms the execution environment code. Specific examples of execution environment code include an operating system 137, which in turn can include one or more device emulation modules 139, a management module 138, and a secret manager 133. The operating system 137 can generally manage the offload device and be configured to determine the type of virtual components to instantiate based on configuration information for the virtual machine instance. As such, in some embodiments the operating system can include functionality similar to the virtual machine monitor that runs on the physical computer system. The device emulation module 139 can be configured to perform the emulation and instantiation of the virtual components on the offload device 130. The management module 138 can be configured to communicate with the control plane manager 162, the virtual machine monitor 110, a key management service 169, other offload devices, and services running within the service provider environment 160. The secret manager 133 can manage and store cryptographic keys, digital certificates, or data. The secret manager 133 can expose an interface (such as an application program interface) with operations to put secrets into the secret manager 133 and use the secrets to perform cryptographic operations. In some embodiments, the secret manager 133 may include interfaces to delete or remove secrets. In some embodiments, the secret manager 133 may not include such interfaces (e.g., it may not include a GET API or something equivalent). In an example embodiment, the operating system and software that runs on the operating system is the execution environment. Of course, one of skill in the art can appreciate that an execution environment may have fewer or a greater number of programs, the functions of the described programs can be combined into one or more programs, or the operating system itself can include any or all of the functionality described with respect to the programs that run on it. Thus, the illustrated execution environment code can be combined in various ways depending on the design choices of the implementer. The processor 132 and memory 134 of the offload device 130 are separate from the processor 102 and memory 104 of the physical computing device 100. The offload device 130 can include a local data store (not shown), and/or be configured to communicate with a data store over a network (not shown).

The offload device can include a network interface controller (NIC) 136. The offload device can be in communication with a control plane manager 162 via a network. The offload device can be configured act as an intermediary for providing instructions from the control plane manager to the virtual machine monitor 110. Also, as illustrated in FIG. 1, the offload device 130 can be configured act to provide communications between the client device 164 and the physical computing device 100.

The offload device 130 can host and emulate one or more virtual components that are used by the instantiated virtual machine instances substantially independent of one or more physical computing device 100 resources. The device emulation modules can reconfigure the virtual components, such that the virtual components 140 can be removed, changed, added, or otherwise reconfigured to address the configuration of the virtual machine instances 120 on the physical computing device 100. The offload device 130 can include virtual I/O component groups 142. Each virtual I/O component groups 142 corresponds to a virtual machine instance 120 on the physical computing device 100.

Generally described, the virtual machine monitor 110 executed on the physical computing device 100 is configured to manage various aspects associated with instantiated virtual machines instances. The virtual machine monitor 110 can implement management functions that provide direct access to the hardware of the physical computing device 100. To support hosted virtual machine instances, the virtual machine monitor 110 can instantiate guest domains on the physical computing device 100 for each virtual machine instances 120 by allocating the guest domains memory and time on the physical CPUs. As previously described, the allocated virtual resources include three primary virtualized resources that are utilized by the instantiated virtual machine instances, namely, virtual processing resources, virtual memory resources, and virtual I/O resources.

The virtual machine instances 120 may be provisioned to provide a variety of different desired functionalities depending on the needs of a data center or client computing device 164. Examples of the types of desired functionality can include, but are not limited to: database management, serving or distributing data or content (e.g., Web servers), managing load balancing or network resources, managing network connectivity or security, providing network addressing information, managing client or server redirection, or other functionalities. In some embodiments, the virtual machine instances 120 may be provisioned to implement portions of a hosted network or to simulate one or more components of a hosted network. Illustratively, the virtual machine instances 120 may be configured to provide specific functionality associated with the components of a hosted network or simulation of the components of the hosted network. The virtual machine instances 120 may be provisioned generically when a desired functionality is not specified or is otherwise not available.

With reference to FIGS. 1, 2A, 2B and 3, the security component 150 can include a dedicated microprocessor, such as a TPM module. In an embodiment, the security components can be configured to measure firmware, software and other platform components on the physical computing device 100 and offload device 130. The security component 150 can provide measurements of platform components 152 so that system software, as well as local and remote management applications, may use those measurements to make decisions. This can help defend against software-based attacks aimed at stealing sensitive information by corrupting system code, BIOS code, or modifying the platform configuration. In specific example embodiments, the security component on the offload device can be used to validate the boot environment code of the offload device 130, the execution environment code of the offload device 130, both the boot environment code and the execution environment code of the offload device 130.

The security component 150 can include specific registers, which can be referred to as platform configuration registers (PCR), that hold the various measurements in a shielded location in a manner that can mitigate against spoofing. The measurements of the platform components can consist of a cryptographic hash using a Secure Hashing Algorithm (SHA), such as the SHA-1 or SHA-2 hashing algorithms. The cryptographic hash algorithm can be configured such that (for all practical purposes) the hash result, also referred to as a hash digest or a hash, of any two platform components will only produce same hash value if the platform components are identical.

Measurements can be performed by the security component 150 before platform components are allowed to execute. For example, in an embodiment, when the offload device 130 boots, the measurements for the BIOS can be made and a hash sent to the security component 150 and the BIOS can run and send measurements for the load boot loader code to the security component. Next, the boot loader code can execute and start loading execution environment code, such as offload device controller software. The boot loader code can take measurements of the execution environment code and pass a hash result to the security component. The execution environment code can then start running and measure software that it loads and pass the hash result to the security component. In one configuration, as the measurements are passed to the security component 150, it can compare measured values of a platform component 152 to value stored in the security component 150. If the values match, the component can be validated. The security component 150 can be configured such that the only way to arrive at a particular measurement is to take the same measurements in exactly the same order. If any module being measured has been modified, the resulting measurement will be different and the security component 150 will be unable to unseal one or more cryptographic keys sealed to valid measurements. In some cases different acceptable versions of the BIOS or other platform components can be stored in the security component 150. Each acceptable version of a booting and/or execution environment can be associated with different measurements. The security component can store each of the determined acceptable configurations.

The measurements stored in the registers of the security component can be available both locally and remotely. The security component can digitally sign the measured values so that an entity (e.g., a network-based service) can verify that the measurements come from, and are protected by, a security component 150. This can be used to enable remote attestation to detect tampering, corruption, and malicious software. Additionally, the values can be used to identify the execution environment and compare them to their own lists of known-good values to further categorize the platform.

In the embodiment in FIG. 2A, the security component 150A can be configured to validate an offload device's booting environment code and/or the offload device's execution environment code. The offload device booting environment comprises a plurality of platform components 152A of the offload device 130.

The security component 150B can be configured to validate a physical computing device's booting environment code. The physical computing device booting environment code comprises a plurality of platform components 152B of the physical computing device, such as the BIOS and boot loader for the virtual machine monitor 110. In an embodiment, if the boot environment of the physical device 100 is valid, its measurements can be used to unseal a key that can be used by the virtual machine monitor 110 to perform cryptographic operations.

The security component 150A can be configured to independently validate the offload device booting environment code and/or execution environment code. The security component 150B can be configured to independently validate the physical computing device booting environment code. The security component 150A can determine a composite measurement associated with the offload device 130 that is independent of the composite measurement associated with the physical computing device 100. In some embodiments, the security components 150A and 150B can communicate with each other to form a single composite measurement that represent a composite environment of the offload device 130 and the physical computing device 100. For example, after the security component 150B can communicate the composite measurement associated with the physical computing device boot environment to the security component 150A. The security component 150A can determine a composite measurement associated with the physical computing device booting environment and the offload device booting environment and/or offload device execution environment.

In some embodiments, after the boot environment code of the offload device 130 is validated, the security module 150A can unseal encryption keys, such as an endorsement key, for use by the operating system 137 or management module 138, on the offload device 130. The operating system 137 or management module 138 can use the encryption keys to prove (e.g., authenticate) to a control plan manager 162 that the offload device 130 is running valid software. The management module 138 can use the encryption keys to perform various management actions after validation of the offload device 130. In some embodiments, the physical computing device 100 needs to be validated prior to release of the encryption keys. In some embodiments, the security module 150A needs measurements from the execution environment code to unseal encryption keys. Like the prior example, after keys are unsealed the operating system 137 or management module 138 can use the encryption keys to perform various operations. In this embodiment, by validating the execution environment code the offload device is trusted to be running validated software.

In some embodiments, a control plane manager 162 can quarantine the offload device and/or physical computer system if the offload device 130 cannot verify the execution environment code or the booting environment code, and therefore cannot be authenticated. In some embodiments, the management module 138 or the control plane manager 162 can restrict execution of applications such that the applications only execute on computing devices that are validated. For example, if the boot environment code of the computing device 100 cannot be validated, the management module 138 could communicate this information to the control plane server 162. The management module 138 could also prevent network traffic from leaving the physical computing device 100, other than network traffic coming from the offload device 130.

In one embodiment, the offload device 130 can have a public key for a corresponding private key that is released for use to the virtual machine monitor 110, if it successfully validates. The virtual machine monitor can then sign data with the private key and send an authentication request including it to the offload device 130. The offload device 130 can verify that the physical computing device 100 used the private key with the corresponding public key. If authenticated, the offload device 130 can report to the control plane manager 162 that the physical computing device 100 and the virtual machine manager 110 have been authenticated, and allow the virtual machine monitor 110 to use resources controlled by the offload device 130.

Figure 2B:
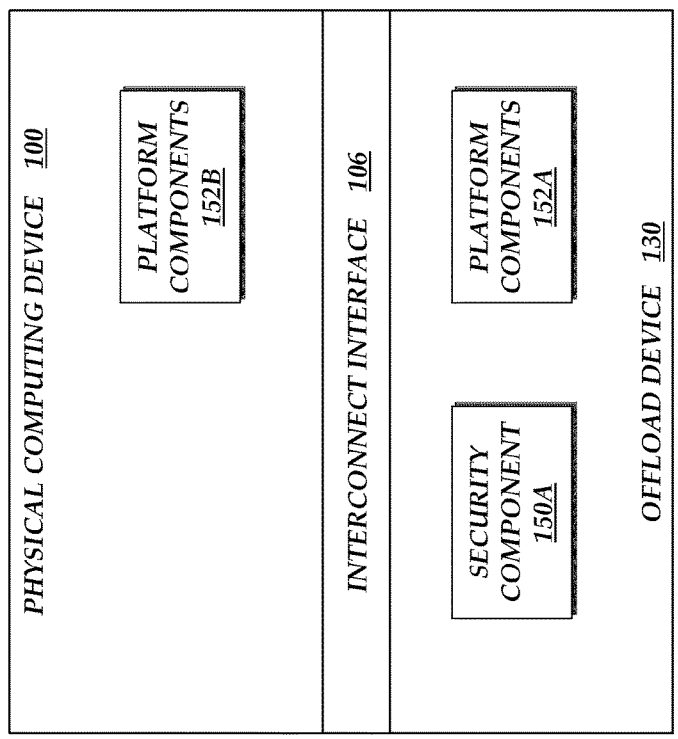
FIG. 2B is a block diagram depicting another embodiment of illustrative components and configurations of a physical computing device and offload device.

FIG. 2B is a block diagram depicting a physical computing device 100 with an offload device 130, the security component 150A on the offload device 130. FIG. 2B differs from FIG. 2A in that only the security component 150A on the offload device 130 is illustrated. In certain embodiments, the security component 150 on the offload device may be utilized to validate platform components 152A on the offload device and platform components 152B on the physical computing device 100.

With reference to FIG. 3, an embodiment of the physical computing device 100 and the offload device 130 includes a plurality of virtual machine instances 120 with virtual security modules 154. Each virtual security module 154 is associated with a virtual machine 120. Also, each virtual security module 154 is instantiated based on the security component 150 on the offload device 130, the management module, and/or the device emulation module 139. The offload device 130 can virtualize the security component 150 and the virtual machine monitor 110 can assign a virtual security module 154 to each virtual machine instance. The messages sent to the virtual security module 154 can be sent to the security component 150 for handling. Messages sent from the security component 150 can be routed to the appropriate virtual security module 159. As such, the virtual security modules 154 can be configured to provide security component functions to the associated virtual machine instance 120. The virtual security modules 154 can be queried and accessed in the same manner as the physical security component 150 on the offload device 130 can be queried by the management module 138 or other code that runs in the execution environment.

A virtual security module 154 can be used by a virtual machine instance 120 in various ways. For example, in an embodiment, software running in the virtual machine can query a virtual security module to obtain the measurement used to validate the offload device 130. The request can be routed to the security component 150, which in turn can provide the measurement back to the virtual machine instances 120 via the virtual security module 154. In some example embodiments, the measurements can be signed by a key that was unsealed using measurements of the boot environment code and/or the execution environment code on the offload device 130. Software in the virtual machine instance 120 can have access to the measurements via the service provider and can compare the measurement received from the virtual security module 154 to the measurements made available.

In some embodiments, the virtual security module 154 can sign a message with a private key and return the signed message to the virtual machine instance 120 instead of a measurement. The virtual machine instance 120 can then authenticate the message using the signature and a digital certificate. For example, each virtual security module 154 can be provided a separate service provider endorsement key, which in turn can be stored in a secret manager 133 on the offload device 130. In this example, a key in the security component 150 may be unsealed using measurements of the boot environment and/or the execution environment of the offload device 130. This key can be used to sign a request to a key management service 169 requesting a service provider endorsement key for the virtual machine instance 120. The key management service 168 can authenticate the signature using a public key and generate or retrieve a private key and send it to the offload device 130. The key can be stored in the secret manager 133 on the offload device 130. The service provider endorsement key can be used to attest to the validity of the measurements performed by the physical security component 150 of the offload device booting environment, sign a message sent to the virtual machine, or be used by the virtual machine instance. Software running in the virtual machine instance 120 can use a service provider certificate including a public key to verify that the correct private key was used make the signature. The virtual security modules 154 may use the service provider endorsement key to provide confirmation of the validation of a particular booting environment code and/or execution environment code while making such environment(s) opaque to the virtual machine instance 120. In some embodiments, the virtual security modules 154 may be configured to interact with the security component (not illustrated) on the physical computing device 100 to confirm the validation of a particular booting environment with platform components on the physical computing device 100.

Figure 4:
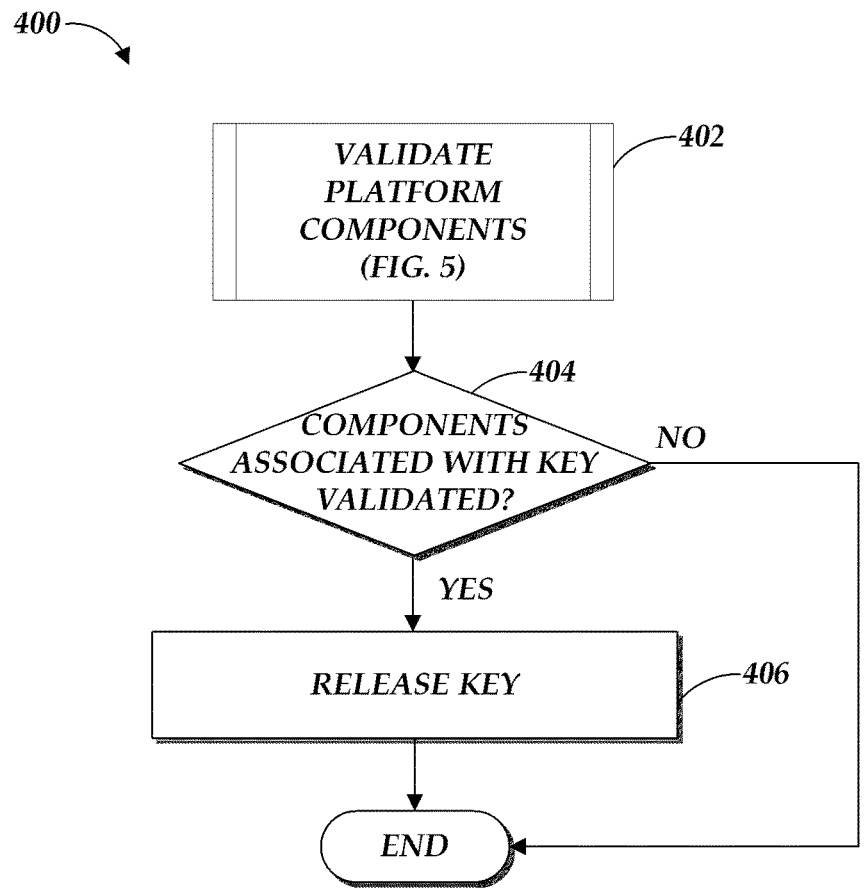
FIG. 4 illustrates an embodiment of a flow diagram of a routine for releasing keys based on a validated booting environment.

FIG. 4 is a flow diagram of a routine 400 for releasing a sealed key that is stored in the security component 150A for use (e.g., the security component enables use of the key). The key can be a cryptographic key that can be enabled for use based upon the validation of components within a booting environment and/or an execution environment. Illustratively, routine 400 may be implemented by the security component 150 of the offload device.

At block 402, the system validates the platform components for a booting environment and/or an execution environment. An illustrative routine, such as routine 500 (FIG. 5) may be utilized for the validation of platform components. The validation of the platform components can be a portion of the total platform components within the booting environment or the entire booting environment. After one or more of the platform components has been measured and validated, the process can proceed to block 404. For example, when the offload device powers on, the security component can measure and validate the BIOS prior to running it; the boot loader prior to it running; an operating system prior to it running; and so forth.

At block 404, the security component 150 on the offload device 130 can determine whether the components associated have been validated. For example, the security component 150 can use the measurements to unseal a key. For example, the measurement can include measurements from the boot environment code and the execution environment code on the offload device 130. As such, if any of the components associated with a key fail validation, then the key remains locked within the security component 150 and the process ends.

In some embodiments, the security component 150 can be configured to unseal keys based on the validation of platform components on the offload device 130 and physical computing device 100. For example, the security component 150B can validate the platform components 152B of the physical computing device 100, and the offload device security component 150A can validate the platform components 152A of the offload device 130. The validation of the platform components can be performed in accordance with the routine 500. In such an embodiment, the security component 150B can request measurements associated with the physical computing device booting environment. The measurements may be combined with the offload device measurements to result in a single composite measurement representing both configurations of the physical computing device 100 and the offload device 130. The combined measurements can be associated with specific keys.

If the components associated with the key are validated, the process proceeds to block 406 and a key associated with the booting environment and/or the execution environment, or portion thereof, is unsealed. Once unsealed, the key can be used to perform cryptographic functions, such as sign requests the management module makes to a virtual machine monitor 110, a key management service 169, services 168 operated by the service provider, etc. In a specific example, the key can be used to decrypt a file stored in the offload device 130 that includes one or more additional keys, such as web service application program interface keys used to authenticate to services operated by the service provider. For example, a key can be used to sign a message to a control plane computer system, such as a registration server. The registration server can use a public key corresponding to the key to authenticate the message. After authentication, the registration server can add the physical computer system to a list of servers available to host virtual machine instances.

In an example embodiment, security component 150A may be configured to make a key available for use if both the physical computing device 100 and the offload device 130 are validated. In the same or a similar embodiment, security component 150A can be configured to make a key available if offload device 130 is validated. Each key stored by a security component 150 can sealed to different measurements. In doing so, any key may be released as appropriate for the validation of any particular booting environment code and/or execution environment code. For example, different keys can be made available depending the on whether different conditions have been satisfied. Some illustrative, non-limiting examples of circumstances where keys can be made available can include: after validation of the offload device 130; after validation of the offload device 130 and a determination that the virtual machine manager 110 is operating in a valid state; and after verification that a designated customer is operating on the physical computing device 100. In some embodiments, the physical computing device 100 can unlock a key for communicating with the offload device 130. In such embodiments, the offload device can challenge the physical computing device security component 150B, and the virtual machine monitor 110 can only respond if physical computing device 100 has been validated, otherwise the key is not made available for use. In which case, the offload device 130 can communicate with the control plane manager 162 that the server cannot be validated.

The released cryptographic key may be utilized for digital signing or the encryption and/or decryption of data. For example, the cryptographic key may be utilized to, sign messages, encrypt/decrypt messages, or decrypt executable code used to communicate with a control plane manager, such as application protocol interface (API) interfaces.

Figure 5:
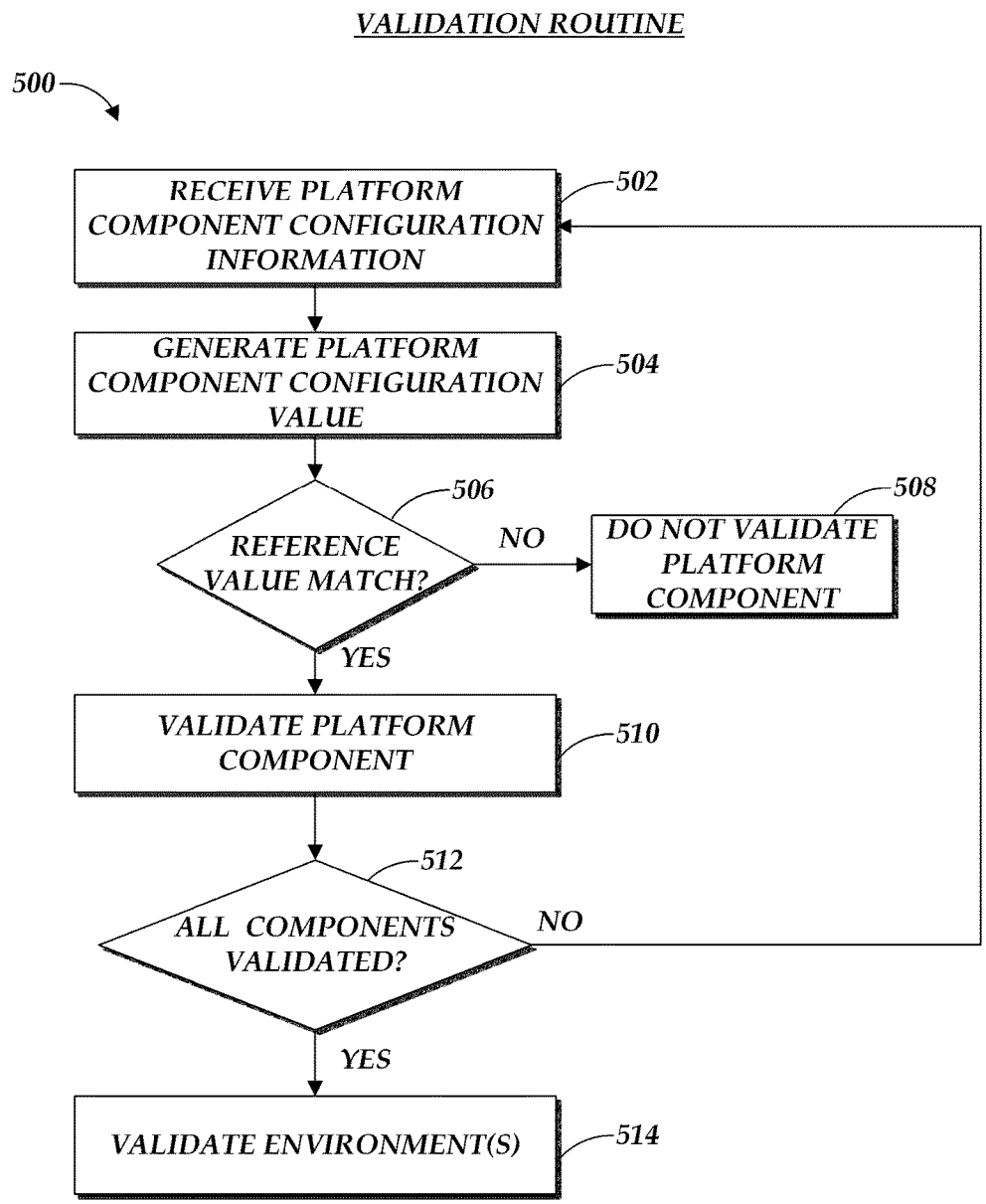
FIG. 5 illustrates an embodiment of a flow diagram of a routine for validation of a booting environment.

FIG. 5 is a flow diagram of a subroutine 500 for validation of platform components 152 within defined environments. Illustratively, routine 500 may be implemented by the security component 150. The booting environment can be defined to include one or more platform components on the offload device 130 or on the physical computing device 100. An execution environment can be defined to include one or more platform components on the offload device 130. The routine 300 can be implemented after the initiation of a power cycle or other event that causes the physical computing device 100 and/or the offload device 130 to reboot. The power cycle may be part of the completion of the utilization of the physical computing device 100 by a previous customer, the determination that the physical computing device 100 may need to be re-provisioned or re-configured, by the completion of an update process, or other events.

At block 502, the security component 150 receives platform component configuration information from a platform component 152, such as measurements. The security component may validate any particular platform component. The platform component configuration information may be any information that may be used to characterize the platform component, such as any identifying values stored in the platform component that may be retrieved from the platform component or related to the platform component during the boot process. The platform component configuration information may be received automatically as part of the process of booting up the platform component 152 or may be queried by the security component 150 during the boot process of the platform component 152.

At block 504, the security component 150 generates a platform component configuration value based on the received platform component configuration information. The platform component configuration value may any result from any type of mapping from the platform component configuration information, such as a hash of values of the platform component configuration information or by ascribing values to certain characteristics of the platform component. For example, the value can be generated using a SHA-1 or SHA-2 hash algorithm.

At block 506, the security component 150 determines whether the platform component configuration value matches a reference value stored in the security component. The reference value may be a value stored in protected registers on the security component that is stored in the security component. In some embodiments, the security component can be configured to determine a plurality of platform component configuration values prior to comparing the measurements to a value stored in the security component. In such an embodiment, the security component 150 compares the final platform component configuration value to reference value. The platform components associated with a specific register or logical grouping of components that is then compared to a composite value associated with the subset of components.

At block 508, if the reference value does not match the platform component configuration value, the security component 150 does not validate the platform component and a key is not unsealed. If the platform components fail validation, the process can end. In some embodiments, the security component can continue to validate the components to determine the measurements of other platform components.

At block 510, if the reference value matches the platform component configuration value then the security component 150 validates the platform component or grouping of platform components. As discussed above, validation of a platform component 152 may result in storage of an identifier that identifies the platform component 152 as validated and/or a reply message to an inquiry made to the security component 150 concerning whether the platform component 152 is validated.

At block 512, the security component 150 makes a determination as to whether all platform components within a booting environment and/or the execution environment have been validated. The measurement from the previously measured component or grouping of components can be extended to measure the next component or grouping of components, thereby requiring that the measurements be performed in a specific sequence in order to acquire the correct result.

At block 514, the booting environment code and/or the execution environment is validated by the security component 150 once all the platform components within the booting environment and/or the execution environment are validated. As introduced above, as any number of platform components may make up a booting environment, the security component 150 may be configured to validate any number of booting environments dependent on whether the associated platform components have been validated. The validity of the booting environment as a whole can be determined by a single composite measurement representing the entire booting environment. The booting environments include platform components from the physical component device 100 and the offload device 130. Similarly, the security component 150 may be configured to validate any number of pieces of software to validate the execution environment. The validity of the execution environment as a whole can be determined by a single composite measurement representing the all the software that was validated to validate the execution environment (and unseal a key).

Figure 6:
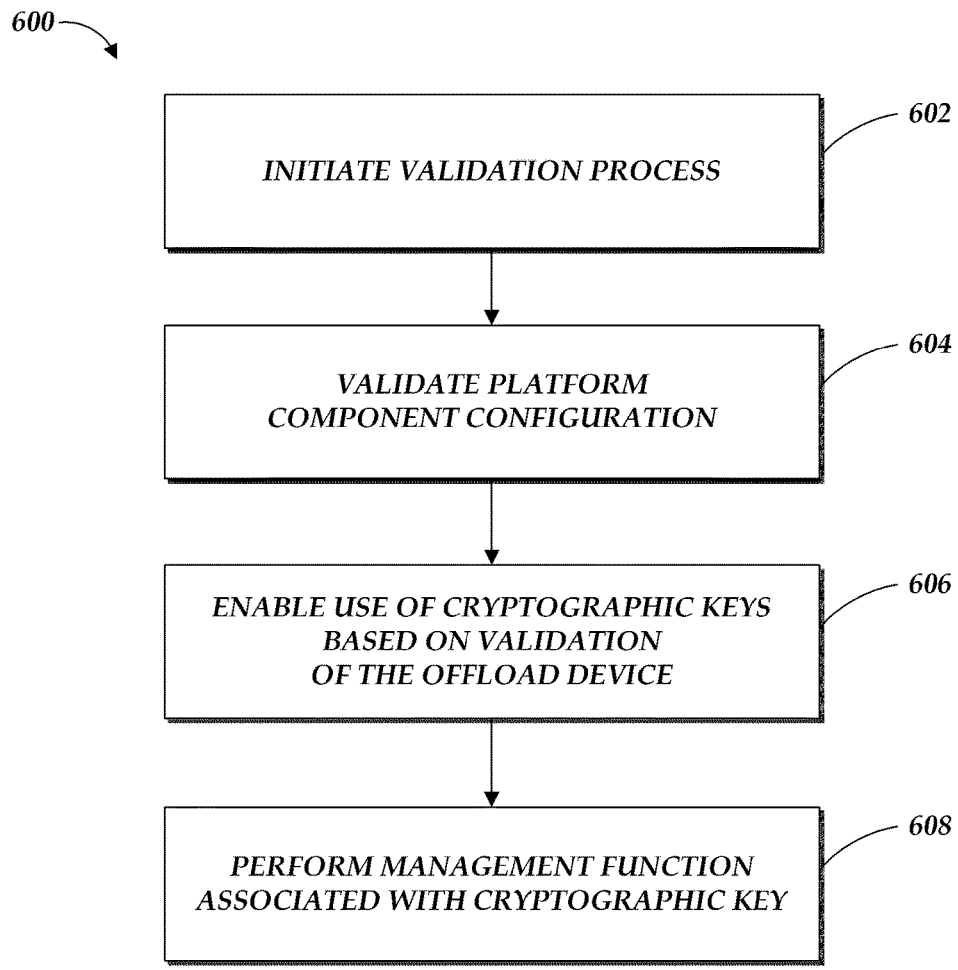
FIG. 6 illustrates an embodiment of a flow diagram of a validation and management routine for an offload device.

FIG. 6 illustrates a routine 600 for an offload device validation by security component 150A. The routine 500 can be performed by a management module 138 or other system manager on the offload device 130, a system manager on the physical computing device 100, a network-based management system, such as a control plane manager 162, or other management entity associated with the offload device.

At block 602, the validation process for the offload device is initiated. In an example embodiment, this can include validating the boot environment code and/or the execution environment code of the offload device 130. In one example, the boot process for the offload device 130 can be initiated after the initiation of the boot process for the physical computing device 100. The boot process can be implemented after the initiation of a power cycle or other event that causes the physical computing device 100 or the offload device 130 to reboot. The power cycle may be part of the completion of the utilization of the physical computing device 100 by a previous customer, the determination that the physical computing device 100 may need to be re-provisioned or re-configured, by the completion of an update process, or other events. In some embodiments, the offload device can have a separate power supply and the boot process can be initiated independent of a boot process associated with the physical computing device. In such embodiments, the offload device may be in communication with a control plane manager 162, which can initiate the boot process of the offload device.

At block 604, the security component can validate platform component configuration (e.g., hash values of measurements of code). For example, validation of the offload device platform component configuration by the security component can be done by extending the measurement of the security model to platform components of the offload device to perform measurements of the various platform components as described in the platform component validation routine 300 illustrated in FIG. 4. The validation of the platform configuration of the offload device 130 can be performed in a series of stages, where at each stage specific platform components can be validated and executed before moving to the next stage. For example, boot code can be validated and executed and operating system code can be validated and executed. The validation of the entire booting environment code base and/or the execution environment code base on the offload device or a subset of platform components can be communicated to the control plane manager 162. Validating the offload device platform components establishes a root of trust or, in other words, establishes the offload device as a trusted computing platform. In some embodiments, the validation of the offload device may incorporate the validation of platform components of the physical computing device 100.

At block 606, the management module can access cryptographic keys stored in the security component 150. After the booting environment of the offload device, or a portion thereof, has been validated as a trusted computing platform, the security component can unseal or otherwise enable cryptographic keys that are sealed within the security component. The unsealing of the cryptographic keys can be based on the validated configuration of the entire booting environment on the offload device, a subset of platform components within the booting environment, the code base of the execution environment or a subset of the execution environment code. As an illustrative example, the security component takes measurements of platform components and determines a composite measurement used for establishing the validity of the trusted computing environment on the offload device. When these measurements match a measurement value stored in the security component, a cryptographic key stored in the security component can be enabled. If the expected measurements do not match the value stored in the storage device, the keys are never unsealed. A recovery process implemented by a system administrator or other entity would need to be performed to revert the offload device back to a trusted configuration before the cryptographic keys would be released by the security component. As the security component 150A validates the state of the offload device, it can unseal one or more keys in the security component based on different stages of validation and measurements of the platform components. The keys can be used by the offload device to perform various crypto operations.

At block 608, the offload device is configured to perform a management function associated with the cryptographic key unsealed at block 506. The management function can be a function that is associated with the physical computing device 100 and/or the offload device 130. The management function can be a function or set of functions that are unlocked by use of the cryptographic keys. The management functions can include commands that relate to the control and operation of the physical computing device and/or the offload device. For example, the management module on the offload device can send a message to the security component 150A and a request to sign the message. The message could be notifying the control plane manager that the offload device and/or the server has booted successfully. The security component 150A can sign the message using the cryptographic key; and return the signed message to the management module, which in turn can send the signed message. The control plane manager can authenticate the signature. The management module can also be configured to authenticate to a control plane system that allows it to register with a fleet of computers in a service provider environment, send requests to obtain additional keys, such as service provider endorsement keys for virtual machines hosted by the physical server, etc. In another embodiment, the management module can send a message to the security component 150A to decrypt keys used by the management module to sign web service application program interface requests to services operated by the service provider environment.

In some embodiments, the unsealing of the keys is not tied to any external dependencies. The security component can determine whether to unseal the keys based on the measurements of the offload device platform independent of input from the management module 138 controlling the operation of the offload device 130. The security component 150 can be used to determine whether the offload device is operating in a trusted configuration and provide the appropriate validations and keys. The management module 138 on the offload device can use the keys and determine an appropriate action to perform.

In an illustrative example, the unsealed cryptographic keys can be used to decrypt the operating instructions for the offload device to communicate with a control plane manager 162, such as the API associated with the commands for interfacing with the control plane manager 162. After receiving the key(s), the offload device can decrypt the API and the API can be used to communicate with the control plane manager 162. Without the keys to the API of the control plane manager 162, the offload device would be unable to communicate with the control plane manager 162, and could, therefore, be isolated from the control plane manager. When the offload device is validated, the offload device can be provided with the keys that enable it to communicate with other computing devices, such as the control plane manager and the physical computing device, and perform other management functions. As another example, the boot process of the physical computing device may be delayed until a specific command is received from the offload device, which can only be provided after the offload device receives a key for decrypting the appropriate command.

In an illustrative embodiment, the keys can be used to digitally sign communications sent from the offload device 130 to systems running within the service provider environment 160, such as a control plane manager 162. For example, the key can be used to sign a request to the control plane manager 162. In response, the control plane manager can validate the signature and add the physical computing device 100 to the fleet of computing devices for operation.

In another illustrative embodiment, the keys can be used to encrypt data that is sent via a network function. In an embodiment the offload device 130 can virtualize a storage device or network interface and the virtual machine monitor can attach the virtualized storage device or network interface to an instance. Data, such as read or write input/output requests or network traffic, can be encrypted by the key on the offload device before it is sent out onto the network.

In another illustrative embodiment, the keys can be used to decrypt modules and/or programs that run on the offload device 130, such as the device emulation module 139, the secret manager 133, etc.

Figure 7:
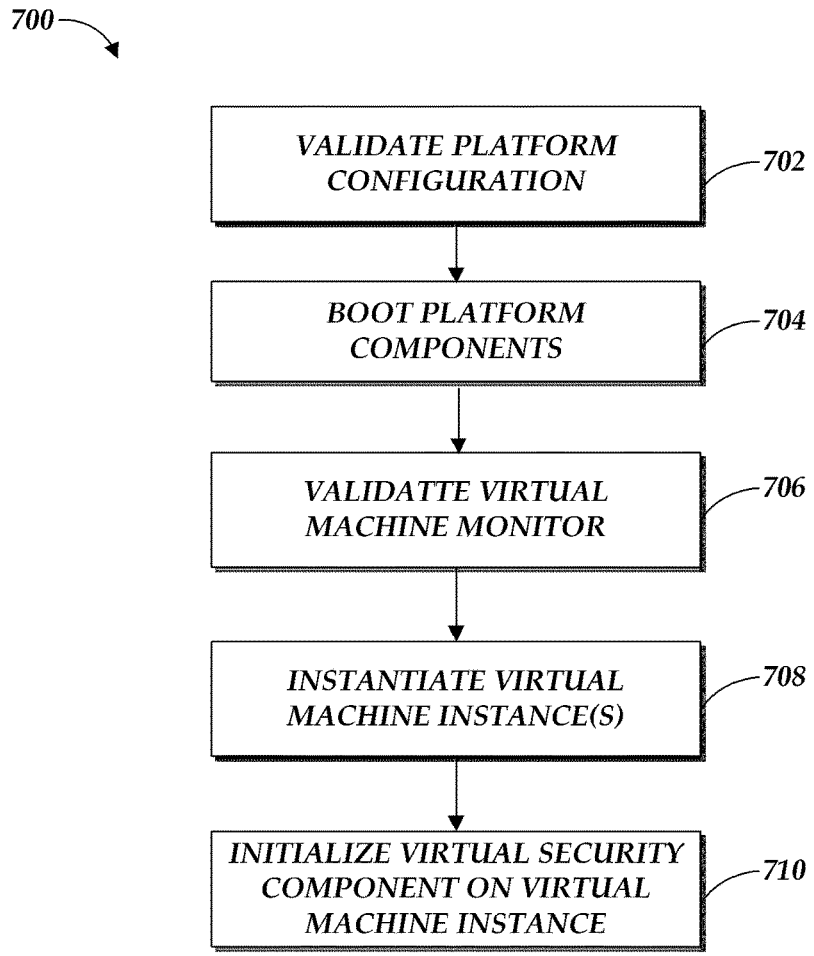
FIG. 7 illustrates an embodiment of a flow diagram of a routine for initializing a virtual security module.

FIG. 7 illustrates a flow diagram of a routine 700 for configuration and initialization of a virtual security module associated with a virtual machine instance. Illustratively, routine 700 may be implemented by the physical computing device 100 and/or the offload device 130.

At block 702, a security component on an offload device can validate platform component configuration. For example, the offload device 130 can include a security component 150. The security component can use platform component configuration for the boot environment code (for the offload device and/or the server) and/or at least a portion of the software that makes up the execution environment of the offload device. As discussed in more detail in prior paragraphs, validation of the platform component configuration can include using measurements to unseal a key, such as a security component endorsement key or a key sealed by a service provider that uses the offload device in a service provider environment. In a specific example embodiment, the platform configuration can include measurements of at least a portion of the software used to effect the execution environment for the offload device 130 (e.g., it can include measurements from at least a portion of the operating system or it can include measurements from all the software that makes up the execution environment). The measurements can be provided to the security component 150, which in turn can use the measurements to unseal one or more keys. For example, the service provider can seal an offload device private key to the measurements that the management module can use to obtain additional keys (e.g., the key can be used to validate the offload device 130 to control plane systems, decrypt keys stored in memory of the offload device 130, communicate with other systems, etc.).

At block 704, the platform components 152 of the booting environment on the physical computing device 100 may complete its boot process. For example, the virtual machine monitor 110 can run and put itself into a state where it can host virtual machines. In an example embodiment, the physical computing device 100 may include a security component 150B, which can be used to validate platform components 152B. In one configuration, a private key (e.g., a physical device private key) could be sealed to the security component 150B using platform component configuration for platform components that relate to the physical computing device's boot environment (e.g., the boot loader, option ROMs, etc.). If the private key is unsealed, a management agent in the virtual machine monitor (e.g., a Dom0 software agent) can send a request for validation to the offload device 130 via interconnect. The management module 138 can receive the request, and use the public key for the physical device private key to validate the virtual machine monitor (e.g., the management module 138 can send a message to the management agent to sign it with the physical device private key and use the signature to determine that the management agent can use the private key, which validates the virtual machine monitor. In an alternative configuration, measurements from platform components 152B could be used to unseal an offload device private key.

At block 706, the virtual machine monitor 110 is validated. As discussed above, the virtual machine monitor 110 manages various aspects associated with instantiated virtual machines instances 120. The virtual machine monitor 110 may be validated as part of the boot process of the offload device 130 or the physical computing device 100. The virtual machine monitor 110 may undergo a measured validation process in the same manner as described in association with other platform components. The virtual machine monitor 110 can be stored in memory on the offload device 130, such as an Option Read Only Memory (ROM) or in memory of the physical computing device 100. Accordingly, the configuration of the virtual machine monitor can be validated on the offload device 130 or the physical computing device 100.

At block 708, the virtual machine monitor can instantiate one or more virtual machine instances 120. Each virtual machine instance 120 is configured within a guest domain on the physical computing device 100. The instantiation of the virtual machine instance 120 includes the determined configuration of computing resources, software, and other components. In an illustrative embodiment, the virtual machine monitor 110 can instantiate the virtual machine instances based on configuration information. The configuration information can determine the allocation of the virtual components 140 between the physical computing device 100 and the offload device 130. For example, the virtual machine monitor may configure the physical computing device 100 to not have any virtual components 140 allocated to the physical computing device 100 and all of the virtual components 140 allocated to the offload device 130. Alternatively, the management module 138 on the offload device 130 can determine the allocation of virtual components 140 between the physical computing device 100 and the offload device 130. In some embodiments, a control plane manager in communication with the offload device 130 can provide the configuration information after receiving verification that the offload devices and/or physical computing devices have been validated.

At block 710, the physical computing device may initialize the virtual security module 154 associated with a particular virtual machine instance 120. The initialization of the virtual security module 154 in the virtual machine instance 120 can occur in conjunction with the instantiation of the virtual machine instance(s). FIG. 3 illustrates the virtual security module as hosted on the offload device 130. In some embodiments, the virtual security module 154 can be hosted by the physical computing device 100.

As discussed above, the virtual security module 154 can be used in various ways. For example, virtual security module 154 can be used by the virtual machine instance to verify that the offload device 130 and/or the virtual machine monitor 110 is operating in a trusted state. In an embodiment, virtual machine instance can query the virtual security module 154 to obtain the measurements used by security module 150 for validation. In this embodiment, executable code on the offload device 130 can receive the request and compose a response, which can include information from the request and the measurements (obtained from security component 150). The executable code can then have the message signed with a private key that is only available for use if the offload device 130 was successfully validated. For example, the key could be a key unsealed by the offload device or received from a key management system. In a specific example embodiment, the key can be a service provider endorsement key that is assigned to the virtual machine instance. The executable code that performs this process can be part of the offload device's execution environment. In an embodiment, this code can be part of the management module 138, the virtual device emulator, or the operating system. One of skill in the art can appreciate that the selection of a specific implementation of the code is based on design considerations (e.g., modularity, bundling of specific functions into a single program, updatability, etc.) and this disclosure is not limited to any specific implementation.

In another embodiment, the offload device 130 can include a key used to decrypt the device emulation module sealed to measurements of the device emulation module itself. The instantiation and initialization of the virtual security module can be encrypted with a sealed key such that the virtual security module 154 cannot be implemented unless the offload device is operating in a trusted configuration. In accordance with this embodiment, the virtual security module 154 would only ever be implemented after the underlying booting environment code or execution environment code has been validated.

After the virtual machine instance 120 verifies the virtual security module 154, the module can be used to store secrets, such as cryptographic keys. As described above, the virtual security module 154 can include an endorsement key that is specific to the virtual security module, e.g., a service provider endorsement key. The virtual machine instance can then use the service provider endorsement key to encrypt/decrypt, or sign data. The endorsement key assigned to the virtual security module can be used to attest to the validity of the operational state of the offload device 130. The assigned endorsement key can be different than the endorsement key of the physical security component 150. By using the assigned endorsement key, the virtual security module 154 can provide the validation information that is independent of the security component. This allows for migration of the virtual machine instance to a different host computer system. For example, the offload device can negotiate a secure connection with an offload device on the new host. The offload device on the initial host can then move the service provider endorsement key and any secrets to the new host in a secure manner. A requesting entity, such as the virtual machine instance, is thereby prevented from having access to the endorsement key associated with the security component 150. In some embodiments, the initialization of the virtual security module can replicate the validation information stored in the security component 150.

Figure 8A:
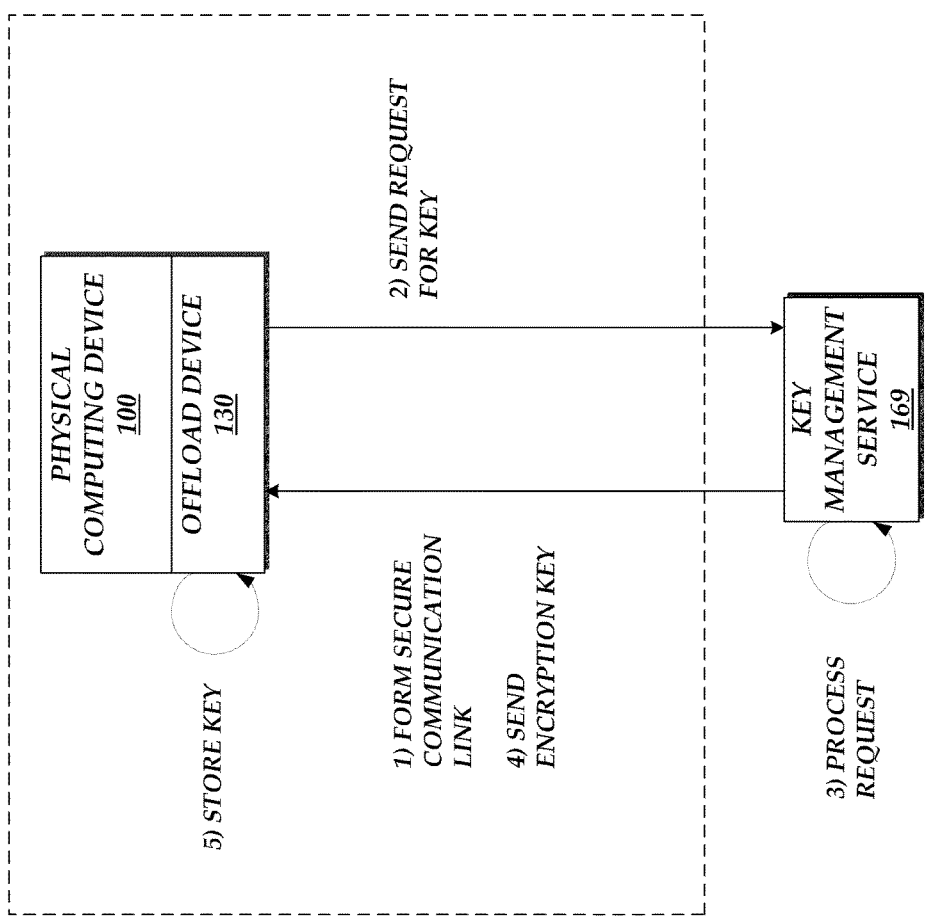
FIG. 8A illustrates an embodiment of a process for key migration from a key management service to an offload device.
Figure 8B:
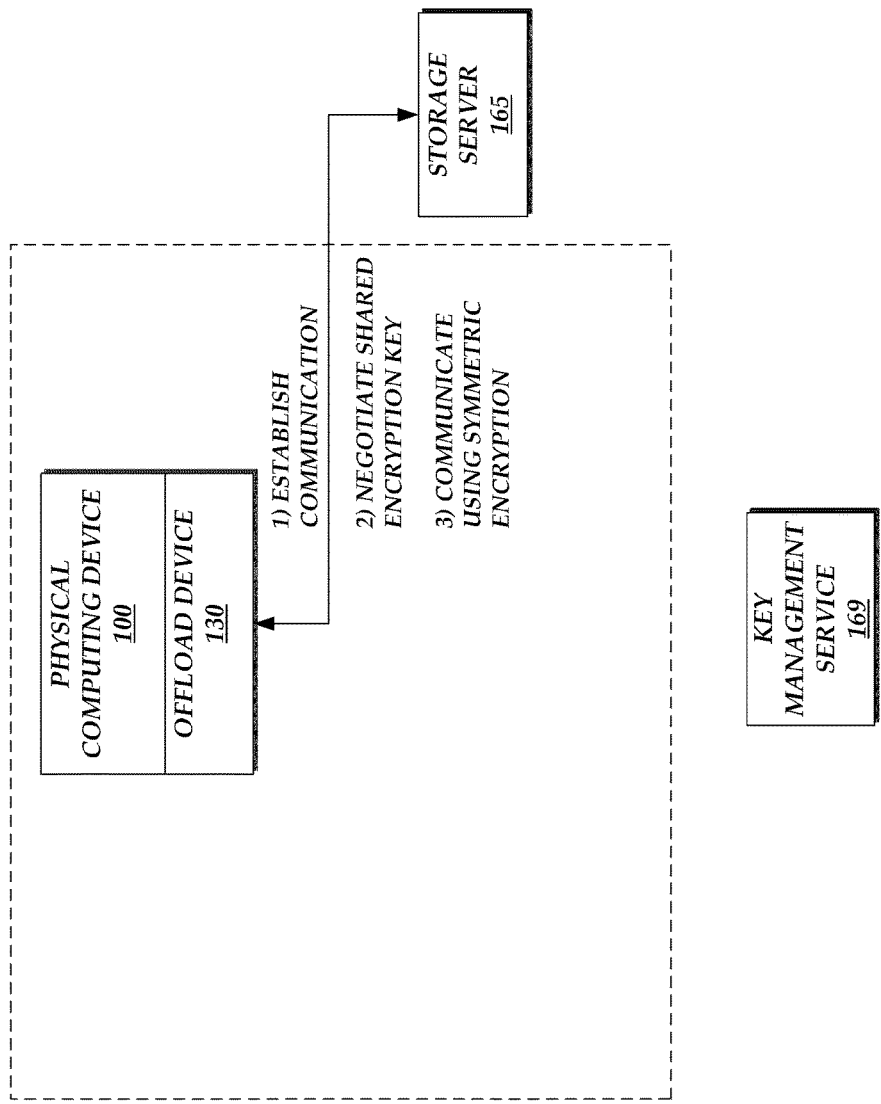
FIG. 8B illustrates an embodiment of a process for communication between physical computing device and a client computing device after key migration.

FIGS. 8A and 8B illustrate an embodiment of a block diagram illustrating interactions between the key management service 169 and the security component of the offload device 130. FIG. 8A illustrates distribution of a private key from the key management service 169 to the security component 150 on the offload device 130. FIG. 8B illustrates communication between physical computing device 100 and a remote computer system using the private key.

At (1), the key management service and the offload device can form a secure communication link. The communication link can be performed using a private root key in the security component 150 and the associated public key. The secure communication link can be formed that is opaque to any administrator or computing device, thereby preventing access to the data being transferred between the key management service and the offload device.

At (2), the offload device 130 can send a request to the key management service for a key. The key management service requests attestation from the offload device 130 to determine whether the offload device has been validated as a trusted operating environment. For example, the security component 150 may gain access to a key that can be used to authenticate to the key management service. In an embodiment, the key could be sealed to the security component 150 using measurements from boot environment code and/or execution environment code. In an alternative configuration, the key could be stored on offload device 130 in an encrypted form and a key unsealed by the security component 150 can be used to decrypt the key. Regardless, once the key used to authenticate is available for use, the management module 138 can send a signed request to the key management service 169, requesting key material that can be used on behalf of a virtual machine instance.

At (3), the key management service can process the request. For example, the key management service can determine that the key used to sign the request is a key assigned to the offload device. The key management service can also verify that the server is hosting a specific virtual machine instance that is to be configured to use encryption on network traffic.

At (4), after the key management service authenticates and authorizes the request for a key, the key management service can send a private encryption key to the security component 150 for storage. In a specific embodiment, this private encryption key can be specific to a virtual machine instance and a corresponding digital certificate can be made available to other offload devices in the service provider environment. At (5), the offload device can store the private key in a shielded location on the security component. For example, the offload device 130 can store the key in the security module 150 or the secret manager 133. The security component and/or the secret manager 133 can be tamper resistant and configured such that the private key cannot be removed by a third party.

In an embodiment, the sequence of events described in association with FIG. 8A can be performed automatically without intervention or interactions from an administrator. In this manner, a supervisor or other personnel cannot access the cryptographic keys that are received by the security component 150 from the key management service 169. The security component is configured to use the keys in order to perform operations associated with the offload device for the physical computing device. A supervisor for other operational personnel can request operations associated with that key, however, the keys cannot be removed. Additionally, the key management service 169 can be located inside or outside of the private network with the same results.

FIG. 8B, illustrates communication between physical computing device 100 and a remote computer system, such as a server hosting a storage volume, after distribution of the private key to the security component 150. The remote computer system 164 can have private key of its own and can obtain a copy of the public certificate of the private key that was sent by the key management service 169 to the security component 150 on the offload device 130. At (1), executable code on the offload device (e.g., the management module 138) can send a request to establish a communication session to the remote computer system (e.g., a server hosting a storage volume that is assigned to a virtual machine instance running on the physical computer system). For example, the offload device may have received a request to attach a storage volume for the virtual machine instance. As part of the request, the offload device may have received an identifier for the remote computer system and a public certificate of the remote computer system. At (2) the remote computer system and offload device can use public keys and the private keys to negotiate a shared encryption key used to encrypt data sent between the offload device and the remote computer system. In an example embodiment, the negotiation of a key can include establishing a shared symmetric key. At (3), the client computing device can use symmetric encryption techniques to communicate using the shared key. In this manner, all communication between the physical computing device and client computing device can be encrypted.

Figure 9:
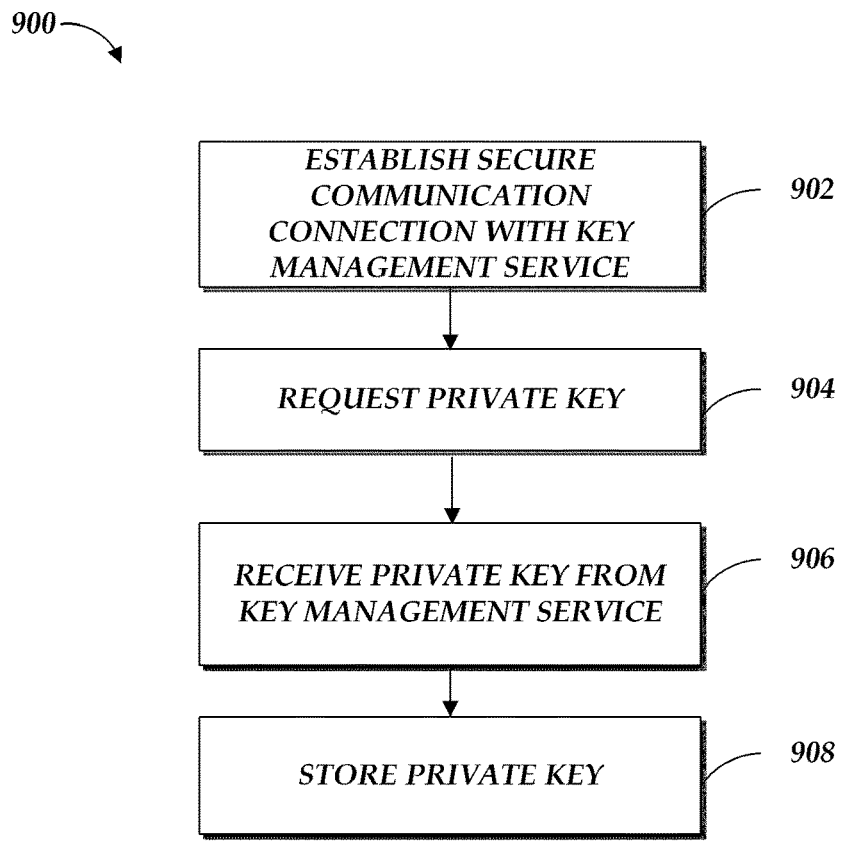
FIG. 9 illustrates an embodiment of a flow diagram for a key migration routine from a key management service to component offline device.

FIG. 9 illustrates a flowchart for a private key migration routine 900 from the key management service 169 to the offload device 130. The routine 900 can be implemented by any system that can negotiate secure communication between the key management service 169 and the offload device 130. For example, the process 900, can be implemented, in whole or in part, by an offload device 130, a security component 150, a virtual security module 154, an operating system 137, a secret manager 133, and a management module 138, among others. Although any number of systems, in whole or in part, can implement the process 900, to simplify discussion, the process 900 will be described with respect to the offload device 130.

At block 902 a secure communication connection is established between the key management service and the offload module 130. The secure communication link can be performed using a private root key in the security component 150 and the associated public key. The secure communication link can be formed that is opaque to any administrator or computing device, thereby preventing access to the data being transferred between the key management service and the offload device 130.

At block 904, after the secure communication link has been established, the offload device can request a key from the key management service. The key management service can request attestation from the offload device. The attestation request can be used to determine whether the offload device has been validated as a trusted operating environment. In one embodiment, the security component 150 processes the request for attestation from the key management service and provides the requested validation For example, the security component 150 may gain access to a key that can be used to authenticate to the key management service. In an embodiment, the key could be sealed to the security component 150 using measurements from boot environment code and/or execution environment code. In an alternative configuration, the key could be stored on offload device 130 in an encrypted form and a key unsealed by the security component 150 can be used to decrypt the key. Regardless, once the key used to authenticate is available for use, the management module 138 can send a signed request to the key management service 169, requesting key material that can be used on behalf of a virtual machine instance.

At block 906, after the key management service authenticates and authorizes the request for a key, the security component 150 can receive the key from the key management service for storage. In a specific embodiment, this private encryption key can be specific to a virtual machine instance and a corresponding digital certificate can be made available to other offload devices in the service provider environment.

At block 908, the security component stores the private key for use during operation of the offload device and the physical computing device. For example, the offload device can store the private key in a shielded location on the security component. In some embodiments, the offload device 130 can store the key in the security module 150 or the secret manager 133. The security component and/or the secret manager 133 can be tamper resistant and configured such that the private key cannot be removed by a third party.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An offload device configured to be communicatively coupled to a host computing device via a hardware interconnect interface, the offload device comprising:
   a security component comprising a security component memory, the memory storing a private key and a corresponding public key, wherein the security component is configured to provide access to a private key based at least in part on a measurement routine of at least a portion of booting environment code for the offload device;
   an offload device processor and memory storing computer readable instructions, a network interface controller configured to communicate over a network, wherein the host computing device is configured to communicate over the network through the network interface controller of the offload device, wherein the offload device processor is configured to execute the instructions that configure the offload device processor to:
   authenticate, over the network, with a remote key management service based, at least in part, on the measurement routine performed by the security component;
   receive a key material from the remote key management service using a secure communication link over the network;
   store the key material in the security component memory; and
   use the key material to generate a cryptographic key used to encrypt input/output storage operations, wherein the input/output storage operations are for a storage service hosting a volume for the host computing device, wherein the storage service is located remotely relative to the host computing device and the offload device.

2. The offload device of claim 1, wherein the cryptographic key is a symmetric key.

3. The offload device of claim 1, wherein the hardware interconnect interface is a Peripheral Component Interconnect Express bus.

4. The offload device of claim 1, wherein the private key is physically embedded in the security module during manufacture of the security module.

5. The offload device of claim 1, wherein the offload device processor is further configured to:
   receive a request for attestation of measurements of the offload device from the remote key management service; and
   transmit a response to the request for attestation to the remote key management service, wherein the response for attestation is based, at least in part, on the measurement routine performed by the security component, wherein the integrity of the attestation response can be validated using the public key.

6. The offload device of claim 1, wherein the security component is further configured to perform cryptographic operations on behalf of at least one of the host computing device or the offload device.

7. A computing implemented method comprising:
by an offload device communicatively coupled to a host computing device via a hardware interconnect interface, the offload device comprising a network interface controller configured to communicate over a network,
validating, by a security component of the offload device, at least a portion of execution environment code for the offload device;
providing access, by the security component of the offload device, to a private key based at least in part on the validation of at least the portion of the execution environment code for the offload device;
sending, by the execution environment code of the offload device over the network, a signed message to a remote key management service, the message signed with the private key made available in response to validation by the security component;
receiving, by the execution environment code of the offload device over the network, a key material from the remote key management service using a secure communication link;
using the key material to generate a cryptographic key used to encrypt input/output storage operations; and
communicating over the network with a network storage service on behalf of the host computing device using the network interface controller of the offload device, wherein the input/output storage operations are for the network storage service hosting a volume for the host computing device, wherein the network storage service is located remotely relative to the host computing device and the offload device.

8. The computer implemented method of claim 7 further comprising sending, to the security component, a request to sign the message using a key unsealed using measurements of the portion of the execution environment code for the offload device.

9. The computer implemented method of claim 7 further comprising sending, to the security component, a request to decrypt cryptographic keys using the key, the cryptographic keys used to sign the message to the remote key management service.

10. The computer implemented method of claim 7, wherein using the key material in the performance of encryption operations on input/output operations sent to a storage server includes using the key material to negotiate a symmetric key with the storage server.

11. The computer implemented method of claim 7 further comprising:
receiving, by the offload device, a request for attestation of validation of the offload device from the remote key management service; and
transmitting, by the offload device, a response to the request for attestation to the remote key management service, wherein the response for attestation is based on the validation routine performed by the security component.

12. The computer implemented method of claim 11, wherein attestation of validation of the offload device is independent of an attestation associated the host computing device.

13. A non-transitory computer-readable storage medium storing computer executable instructions that configure an offload computing device to perform operations comprising:
by an offload device communicatively coupled to a host computing device via a hardware interconnect interface, the offload device comprising a network interface controller configured to communicate over a network,
validating, by a security component of the offload device, at least a portion of execution environment code for the offload device;
providing access, by the security component of the offload device, to a private key based at least in part on the validation of at least the portion of the execution environment code for the offload device;
sending, by the execution environment code of the offload device over the network, a signed message to a remote key management service, the message signed with the private key made available in response to validation by the security component;
receiving, by the execution environment code of the offload device over the network, a key material from the remote key management service using a secure communication link;
using the key material to generate a cryptographic key used to encrypt input/output storage operations; and
communicating over the network with a network storage service on behalf of the host computing device using the network interface controller of the offload device, wherein the input/output storage operations are for the network storage service hosting a volume for the host computing device, wherein the network storage service is located remotely relative to the host computing device and the offload device.

14. The non-transitory computer-readable storage medium of claim 13, wherein the computer executable instructions further configure the one or more computing devices to perform operations comprising sending, to the security component, a request to sign the message using a key unsealed using measurements of the portion of the execution environment code for the offload device.

15. The non-transitory computer-readable storage medium of claim 13, wherein the computer executable instructions further configure the one or more computing devices to perform operations comprising sending, to the security component, a request to decrypt cryptographic keys using the key, the cryptographic keys used to sign the message to the remote key management service.

16. The non-transitory computer-readable storage medium of claim 13, wherein using the key material in the performance of encryption operations on input/output operations sent to a storage server includes using the key material to negotiate a symmetric key with the storage server.

17. The non-transitory computer-readable storage medium of claim 13, wherein the computer executable instructions further configure the one or more computing devices to perform operations comprising receiving an indication associated with the validation from the security component.

* * * * *